(12) United States Patent
Mumm

(10) Patent No.: US 6,608,635 B1
(45) Date of Patent: Aug. 19, 2003

(54) APPARATUS AND METHOD FOR MAPPING NETWORK TOPOLOGY ELEMENTS AND CONNECTIONS

(75) Inventor: Alexander Mumm, Kornwestheim (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/262,583

(22) Filed: Mar. 4, 1999

(30) Foreign Application Priority Data

Mar. 4, 1998 (EP) .............................. 98103774

(51) Int. Cl.[7] .............................................. G09G 5/00
(52) U.S. Cl. ........................... 345/736; 370/254; 716/8; 716/11
(58) Field of Search ....................... 716/8, 11; 707/220; 370/254; 345/734, 735, 736, 737, 738; 709/200

(56) References Cited

U.S. PATENT DOCUMENTS

| | | | |
|---|---|---|---|
| 4,775,973 A | * 10/1988 | Tomberlin et al. | 370/253 |
| 5,138,614 A | * 8/1992 | Baumgartner et al. | 370/261 |
| 5,627,999 A | 5/1997 | Cheng et al. | |
| 5,715,391 A | * 2/1998 | Jackson | 712/11 |
| 5,742,795 A | * 4/1998 | Kussel | 703/2 |
| 5,793,362 A | * 8/1998 | Matthews | 709/224 |
| 5,808,901 A | * 9/1998 | Cheng | 716/8 |
| 5,930,499 A | * 7/1999 | Chen | 716/8 |
| 6,225,999 B1 | * 5/2001 | Jain et al. | 345/734 |

FOREIGN PATENT DOCUMENTS

| | | |
|---|---|---|
| EP | 306075 A1 | 8/1988 |
| EP | 675453 A1 | 10/1995 |
| EP | 715266 A2 | 11/1995 |
| WO | WO96/39766 | 6/1996 |

\* cited by examiner

Primary Examiner—John F. Niebling
Assistant Examiner—Stacy Whitmore

(57) ABSTRACT

Mapping of a network topology, comprising a plurality of elements with one or more interconnections between the plurality of elements, is accomplished by representing the plurality of elements in a first matrix dimension, and representing the one or more interconnections in a second matrix dimension. A group of elements can be represented in a third matrix dimension. Instead of representing a connecting device for connecting groups of elements in the first matrix dimension, the connecting device can be represented in the second matrix dimension. The mapping can be used for providing a graphical representation of the network topology. In one embodiment, the plurality of elements is represented by parallel lines in the first matrix dimension, and/or the one or more interconnections by parallel lines are represented in the second matrix dimension. A connection between two elements is preferably represented by dots at the points of intersection between the representation of the interconnection between two elements in the second matrix dimension and the representations of the elements in the first matrix dimension.

15 Claims, 4 Drawing Sheets

APPARATUS AND METHOD FOR MAPPING NETWORK TOPOLOGY ELEMENTS AND CONNECTIONS

BACKGROUND OF THE INVENTION

The present invention relates to mapping of a network topology comprising a plurality of elements with one or more interconnections between the plurality of elements, and in particular to the provision of a graphical representation of the network topology.

A network generally represents an arrangement of nodes and connecting branches. In a computer network, two or more computers are connected with one another for the purpose of communicating data electronically. The schematic arrangement of the links and nodes of a network is normally represented in a network topology (or network structure) describing the topographical layout of the network.

FIG. 1 shows a typical mapping or graphical representation of a network topology consisting of a plurality of elements S1 to S6, A and B. The term "element" as used herein may represent one or more individual elements, groups of elements, one or more subnets, or the like. In the example of FIG. 1, the elements A and B shall represent specific networking devices A and B for connecting the elements S1 to S6. Each networking device might represent any kind of element or network connecting device such as a direct physical connection, a connection line, a router, or the like, as known in the art. If additional geographical data such as coordinates is available for the individual nodes in the network, a network map can be derived by scaling the real dimensions in the representation of FIG. 1.

In case that the geographical information is either not available or not relevant, the visualized representation of the network as shown in FIG. 1 might be inappropriate because the positions of the displayed network elements cannot reflect the real geometry of the network. However, this approach is widely used and the coordinates are often calculated by layout algorithms that optimize the network map in a static way, such as avoidance of long edges between nodes and avoidance of overlapping elements. Those layout algorithms may also cause unexpected results since there are no constraints that may limit reorganizations resulting from changes such as element additions or deletions.

A data record representing a network topology generally comprises data representing (the identity of) each element and data representing interconnection(s) between the individual elements. The elements and interconnections in computer networks, e.g. of an Internet protocol type, are usually discovered by queries of a network management system to the individual elements and devices within the network. A router, for example, holds internal configuration data about the connected subnets or other elements that can be retrieved via the network management protocols. The network topology can thus be discovered and stored into data structures comprising data records with at least the minimum information as discussed above. The physical network topology usually cannot be discovered in that way and by those means.

FIG. 2 shows a data record 10, comprising the essential data about the network topology, which is provided to an information processing unit (IPU) 20 which processes and maps the data record 10 to a graphical representation 30 of the network topology as depicted e.g. in FIG. 1.

Another graphical representation 30 of the network topology as known in the art is in form of a connection tree as depicted in FIG. 3. Starting from element A, all elements connected to element A are represented as "sub-elements" S1, S2, S3, and S4. Element S3 again provides as "sub-elements" connections to elements A and B, and so on. This tree representation leads to a clear structure when the network to be represented has a clear hierarchical tree structure with a plurality of branches. However, the tree structure leads to an unclear repetition of "sub-elements" in case that the network structure comprises connection loops or parallel connections.

It is an object of the present invention to provide an improved mapping of a network topology.

SUMMARY OF THE INVENTION

According to the invention, the mapping of a network topology or structure, comprising a plurality of elements with one or more interconnections between the plurality of elements, is accomplished by representing the plurality of elements in a first matrix dimension, and representing the one or more interconnections in a second matrix dimension. The mapping is preferably used for providing a graphical representation of the network topology.

Compared to the map layout without geographical information as shown in FIG. 1, the matrix based network graphical representation according to the invention offers several advantages such as: No misleading positions of elements introduced by layout algorithms without any relation to the real network geometry, alphanumeric sorting may be applied, adding or deleting of elements results e.g. in inserting or removing lines without major restructuring as required for maps. Converting network topology data (with or without geographical information) according to the invention further avoids the problems introduced by free map style layouts as used by current network management systems.

Within computer aided network management systems, the described network graphical representation requires less computational effort. It also offers higher flexibility as expanding subnets to segments or changing drawing styles such as highlighting of defective elements or changing a dot shape at a point of intersection between the first and second matrix dimension depending on the type of network interface.

In a preferred embodiment, a group of elements can be represented in a third matrix dimension.

In another preferred embodiment, instead of representing a connecting device for connecting groups of elements in the first matrix dimension, the connecting device can be ,represented in the second matrix dimension. This allows to better distinguishing between separate groups of elements.

In one embodiment, the plurality of elements is represented by parallel lines in the first matrix dimension, and/or the one or more interconnections by parallel lines are represented in the second matrix dimension.

A connection between two elements is preferably represented by dots at the points of intersection between the representation of the interconnection between two elements in the second matrix dimension and the representations of the elements in the first matrix dimension.

In a further preferred embodiment, the first matrix dimension is substantially perpendicular to the second matrix dimension.

BRIEF DESCRIPTION OF THE DRAWINGS

Other objects and many of the attendant advantages of the present invention will be readily appreciated and become better understood by reference to the following detailed description when considering in connection with the accompanied drawing in which.

DETAILED DESCRIPTION OF THE INVENTION

Figure 1:
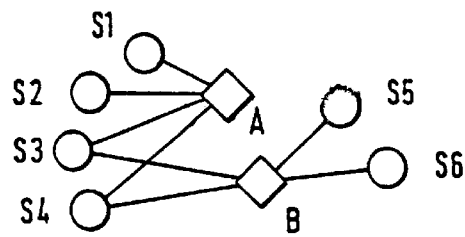
FIG. 1 a typical representation of a network consisting of a plurality of elements S1 to S6, A and B.
Figure 4A:
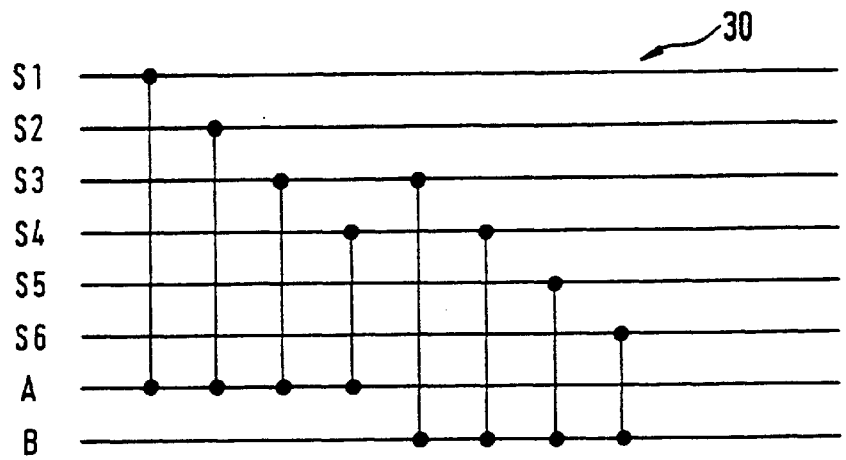

FIG. 4a shows a graphical representation 30 according to the invention for the example of the network topology as depicted in FIG. 1. According to the invention, all elements and interconnections are represented in form of a network matrix. Each individual element S1 to S6, A and B is preferably represented by a horizontal line, forming a first dimension in the network matrix. The interconnections between the individual elements are preferably represented as (vertical) connections between the horizontal lines representing those individual elements to be connected, thus forming a second dimension in the network matrix. Each connection between the individual elements is preferably symbolized by a dot. The graphical representation 30 according to the invention thus avoids the introduction of the position of each element.

Figure 4B:
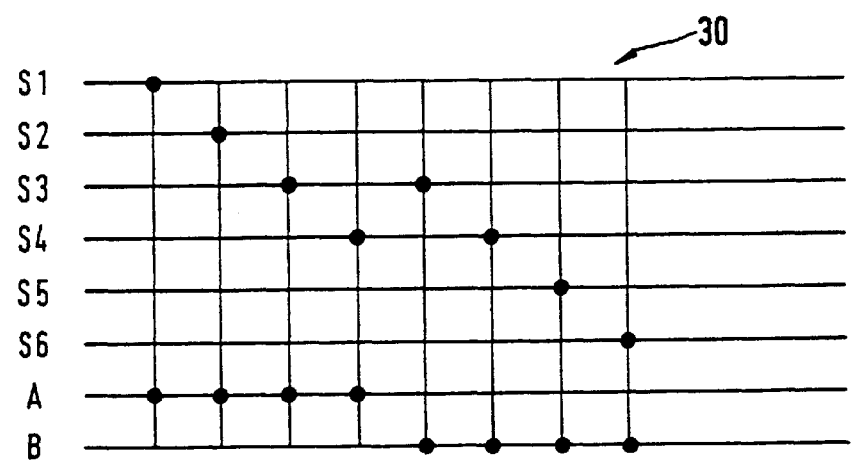

It is clear that the invention is not limited to horizontal and vertical dimensions, but that any matrix shaping (e.g. diagonal lines, warped areas, more than two dimensions) can be applied for the purpose of the invention. Further more, it is apparent that the connection between two elements, e.g. between S1 and A, can also be symbolized (without dots) e.g. by starting a (vertical) connection line at the first element, e.g. S1, and ending the line at the second element, e.g. A. In another embodiment as shown in FIG. 4b, the (vertical) connection lines are kept substantially at the same length, whereby each connection is represented by a dot.

Figure 4C:
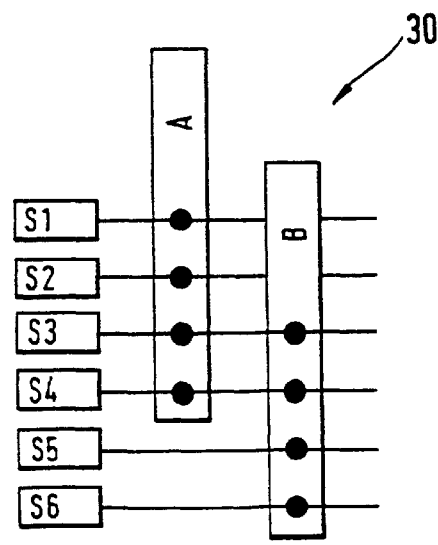

In case that one or more elements represent connecting devices, such as routers, used e.g. for the purpose of connecting groups or subgroups of elements, those connecting devices may also be represented as vertical elements. FIG. 4c depicts a graphical representation 30 of the network according to FIG. 1, wherein the elements A and B are connecting devices. This kind of representation is in particular advantageous for displaying subgroups such as subnets of elements connected via specific connecting devices.

In case that an element represents a group of elements, the graphical representation of that group of elements can be represented in a further dimension.

Figure 5A:
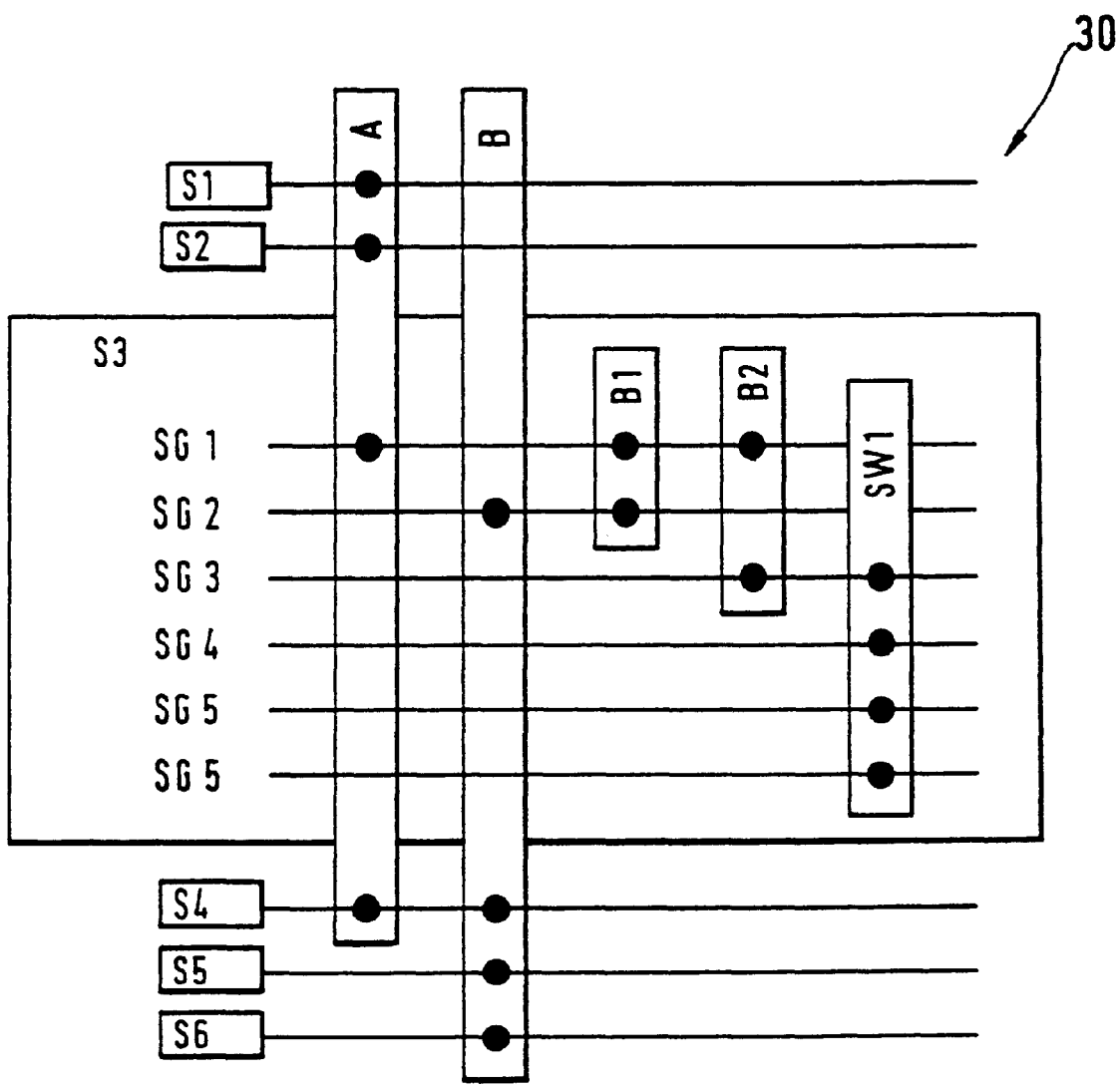
FIG. 5a shows an example of the invention for an Internet protocol network.

FIG. 5a shows an example of the invention for an Internet protocol network. The whole network consists of subnets S1 to S6 connected by routers A and B and is connected as shown in FIG. 1. Subnet S3 consists of segments SG1 to SG5 connected by a switch SW1 and bridges B1 and B2. In the given example, only the segments of one subnet S3 are shown in an expanded section surrounded by a frame. The graphical representation of the subnet S3 represents a further dimension, which can be drawn e.g. in an expanded area within the drawing area (as shown in FIG. 5a) or in an area perpendicular to the drawing area.

Figure 2:
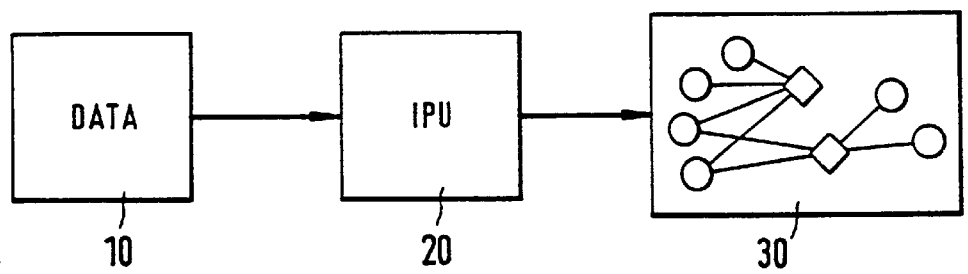
FIG. 2 shows the data flow of a data record 10, comprising the essential data about the network topology, which is provided to an information processing unit (IPU) 20 which processes the data record 10 to a graphical representation 30 of the network topology as depicted e.g. in FIG. 1.
Figure 3:
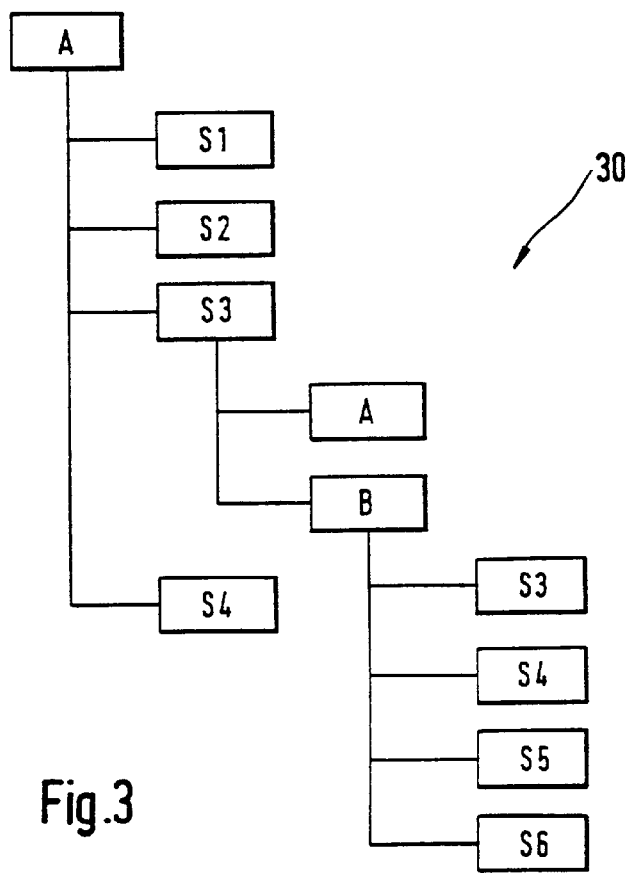
FIG. 3 shows another graphical representation 30 of the network topology as known in the art in form of a connection tree, FIGS. 4a,b,c show graphical representations 30 according to the invention for the example of the network topology as depicted in FIG. 1.
Figure 5B:
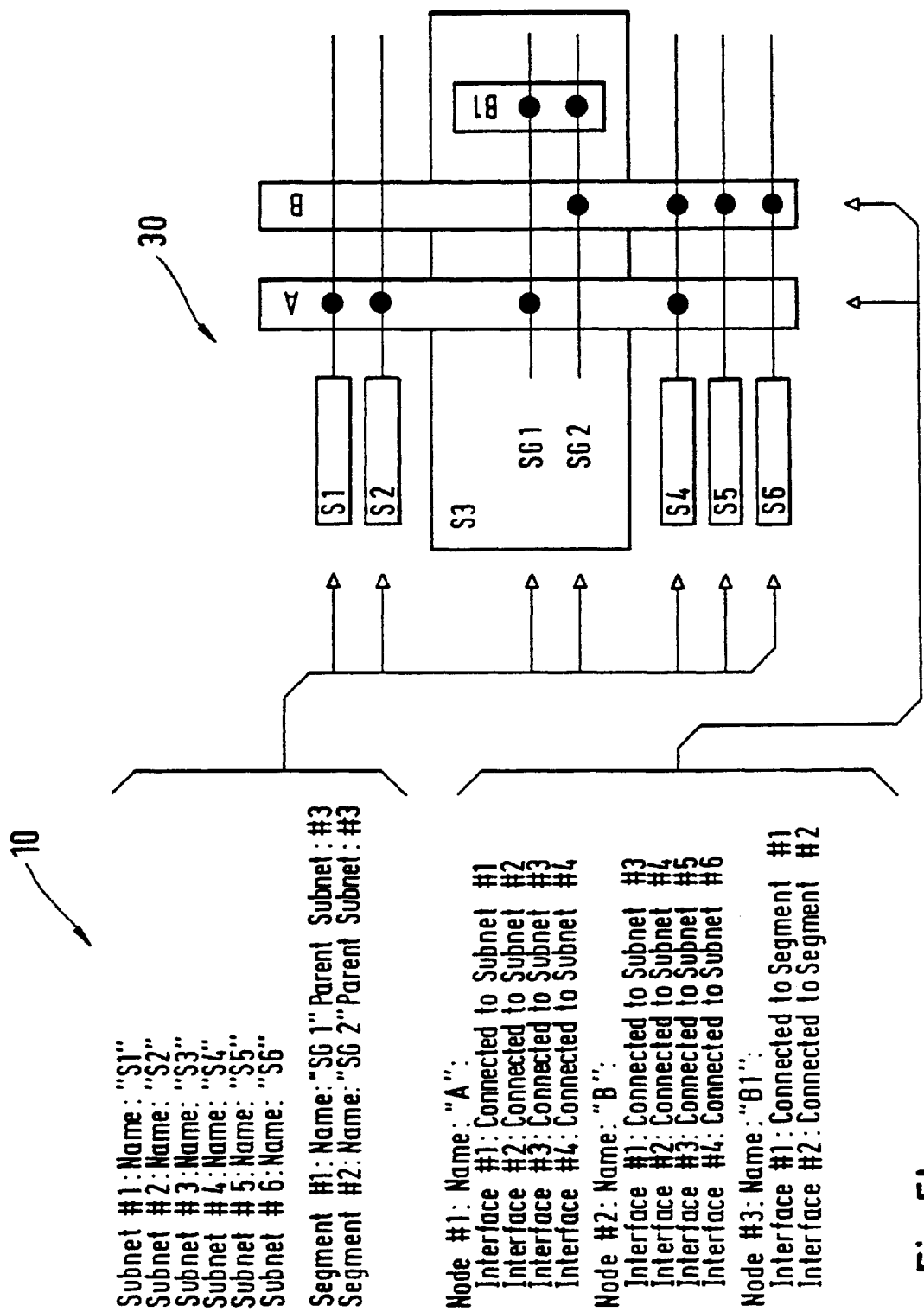
FIG. 5b shows an example for the data flow as depicted in FIG. 2 according to the invention.

FIG. 5b shows an example for the data flow as depicted in FIG. 2. The text block on the left half of FIG. 5b represents the data record 10 and shows a sample listing of a network topology discovery result. The data record 10 is a textual representation of the data structures computed from the queries to the network devices. It is clear that in practical applications there might be a large number of additional attributes such as interface status information or sub-network masks. In FIG. 5b, only data attributes that are relevant for the network topology are shown.

The matrix view on the right half in FIG. 5b illustrates the mapping between the topology data items of the data record 10 and the visualization in the topology matrix. All subnets and segments are mapped to parallel lines with a label for the sub-network/segment name, all nodes are mapped to a perpendicular elements with a dot for each node's interface, indicating the appropriate connection to an attached sub-network/segment. Calculating the required positions of the elements can be performed without any internal rules that are required e.g. for a map style layout This makes sure that the resulting drawing is free of geographical information that ensures a pure representation of the topology data.

What is claimed is:

1. A method for mapping a network topology comprising a plurality of elements with one or more interconnections between the plurality of elements, the method comprising the steps of:

(a) representing the plurality of elements in a first matrix dimension, and (b) representing the one or more interconnections in a second matrix dimension, wherein step (b) comprises a step of:

(b1) representing a connecting device for connecting groups of elements in the second matrix dimension.

2. The method of claim 1, wherein step (b) comprises a step of:

(b3) representing a connection between two elements by dots at the points of intersection between the representation of the interconnection between two elements in the second matrix dimension and the representations of the elements in the first matrix dimension.

3. The method of claim 1, further comprising a step of:

(c) representing a group of elements in a third matrix dimension.

4. The method of claim 1, further comprising a step prior to step (a) of receiving a data record comprising information about the identity of the plurality of elements and about the one or more interconnections between the plurality of elements.

5. The method of claim 1, wherein the first matrix dimension is substantially perpendicular to the second matrix dimension.

6. A method for mapping a network topology comprising a plurality of elements with one or more interconnections between the plurality of elements, the method comprising the steps of:

(a) representing the plurality of elements in a first matrix dimension, and (b) representing the one or more interconnections in a second matrix dimension, wherein step (a) comprises a step of:
- (a1) representing the plurality of elements by parallel lines in the first matrix dimension.

7. The method of claim 6, wherein step (b) comprises a step of:
- (b3) representing a connection between two elements by dots at the points of intersection between the representation of the interconnection between two elements in the second matrix dimension and the representations of the elements in the first matrix dimension.

8. The method of claim 6, wherein step (b) comprises a step of:
- (b3) representing a connection between two elements by dots at the points of intersection between the representation of the interconnection between two elements in the second matrix dimension and the representations of the elements in the first matrix dimension.

9. The method of claim 6, further comprising a step prior to step (a) of receiving a data record comprising information about the identity of the plurality of elements and about the one or more interconnections between the plurality of elements.

10. A method for mapping a network topology comprising a plurality of elements with one or more interconnections between the plurality of elements, the method comprising the steps of:
- (a) representing the plurality of elements in a first matrix dimension, and
- (b) representing the one or more interconnections in a second matrix dimension, wherein step (b) comprises a step of:
  - (b2) representing the one or more interconnections by parallel lines in the second matrix dimension.

11. The method of claim 10, wherein step (b) comprises a step of:
- (b3) representing a connection between two elements by dots at the points of intersection between the representation of the interconnection between two elements in the second matrix dimension and the representations of the elements in the first matrix dimension.

12. The method of claim 10, wherein step (b) comprises a step of:
- (b3) representing a connection between two elements by dots at the points of intersection between the representation of the interconnection between two elements in the second matrix dimension and the representations of the elements in the first matrix dimension.

13. The method of claim 10, further comprising a step prior to step (a) of receiving a data record comprising information about the identity of the plurality of elements and about the one or more interconnections between the plurality of elements.

14. A system for mapping a network topology comprising a plurality of elements, with one or more interconnections between the plurality of elements, the system comprising:
- means for representing the plurality of elements in a first matrix dimension, and
- means for representing the one or more interconnections in a second matrix dimension, wherein the first matrix dimension is substantially perpendicular to the second matrix dimension.

15. The system of claim 14, further comprising: means for representing a group of elements in a third matrix dimension.

* * * * *